(12) United States Patent
Mondino et al.

(10) Patent No.: US 9,593,273 B2
(45) Date of Patent: Mar. 14, 2017

(54) REFRIGERANT MIXTURES

(71) Applicant: TAZZETTI S.p.A., Volpiano (IT)

(72) Inventors: Riccardo Mondino, La Loggia (IT);
Valentina Longoni, S. Maurizio Canavese (IT)

(73) Assignee: Tazzetti S.P.A., Turin (IT)

( * ) Notice: Subject to any disclaimer, the term of this patent is extended or adjusted under 35 U.S.C. 154(b) by 0 days.

(21) Appl. No.: 14/414,462

(22) PCT Filed: Jul. 16, 2013

(86) PCT No.: PCT/IB2013/055834
§ 371 (c)(1),
(2) Date: Jan. 13, 2015

(87) PCT Pub. No.: WO2014/013428
PCT Pub. Date: Jan. 23, 2014

(65) Prior Publication Data
US 2015/0175866 A1 Jun. 25, 2015

(30) Foreign Application Priority Data
Jul. 16, 2012 (IT) .............................. TO2012A0627

(51) Int. Cl.
C09K 5/04 (2006.01)
F25B 45/00 (2006.01)

(52) U.S. Cl.
CPC .............. *C09K 5/042* (2013.01); *F25B 45/00* (2013.01); *C09K 2205/12* (2013.01); *C09K 2205/40* (2013.01); *F25B 2345/001* (2013.01)

(58) Field of Classification Search
CPC ........................... C09K 2205/12; C09K 5/042
USPC ..................................... 252/67; 62/529, 115
See application file for complete search history.

(56) References Cited

U.S. PATENT DOCUMENTS

| | | | | |
|---|---|---|---|---|
| 7,086,251 B2 * | 8/2006 | Roberts | ................. | C09K 5/042 62/612 |
| 7,308,805 B2 * | 12/2007 | Roberts | ................. | C09K 5/042 62/612 |
| 2004/0021124 A1 * | 2/2004 | Cho | ........................ | C09K 5/042 252/2 |
| 2006/0021377 A1 * | 2/2006 | Lee | ........................ | F25J 3/0219 62/612 |
| 2009/0261289 A1 * | 10/2009 | Ham | ..................... | C09K 5/045 252/67 |
| 2013/0200294 A1 * | 8/2013 | Carr | ..................... | C10M 169/04 252/68 |

FOREIGN PATENT DOCUMENTS

| | | |
|---|---|---|
| EP | 0546447 A1 | 6/1993 |
| EP | 0812895 A2 * 12/1997 | ............. C09K 5/042 |
| EP | 2058380 A2 * 5/2009 | ............. C09K 5/042 |
| WO | 02/20690 A1 | 3/2002 |

OTHER PUBLICATIONS

Ki-Jung Park et al.; "Performance of R170/R1270 mixture under air-conditioning and heat pumping conditions"; Journal of Mechanical Science and Technology; vol. 24, No. 4, Apr. 1, 2010, pp. 879-885.

Dalkilic A.S. et al.; "A performance comparison of vapour-compression refrigeration system using various alternative refrigerants"; International Communications in Heat and Mass Transfer; Pergamon, New York, US; vol. 37, No. 9, Nov. 1, 2010, pp. 1340-1349.

\* cited by examiner

*Primary Examiner* — Douglas McGinty
(74) *Attorney, Agent, or Firm* — Thomas | Horstemeyer, LLP

(57) ABSTRACT

Use of a gaseous mixture, selected from the group consisting of—propylene in a concentration from 90% to 99% by weight and a gas selected from the group consisting of butene, ethylene and ethane or mixtures thereof in a concentration from 1% to 10% by weight; as replacement or alternative refrigerant gas for R404A, R507A and/or R407C, and/or other replacement or alternative refrigerants for R404A, R507A and R407C containing HFC (hydrofluorocarbons), HFO (hydrofluoro olefins) and HFE (hydrofluoro ethers).

7 Claims, 6 Drawing Sheets

REFRIGERANT MIXTURES

CROSS-REFERENCE TO RELATED APPLICATION

This application is the 35 U.S.C. §371 national stage of PCT Application No. PCT/IB2013/055834, filed Jul. 16, 2013, which is herein incorporated by reference in its entirety and which also claims priority to, and the benefit of, Italian Patent Application TO2012A000627, filed Jul. 16, 2012, which is herein incorporated by reference in its entirety.

DETAILED DESCRIPTION

Refrigerant Mixtures

Figure 1:
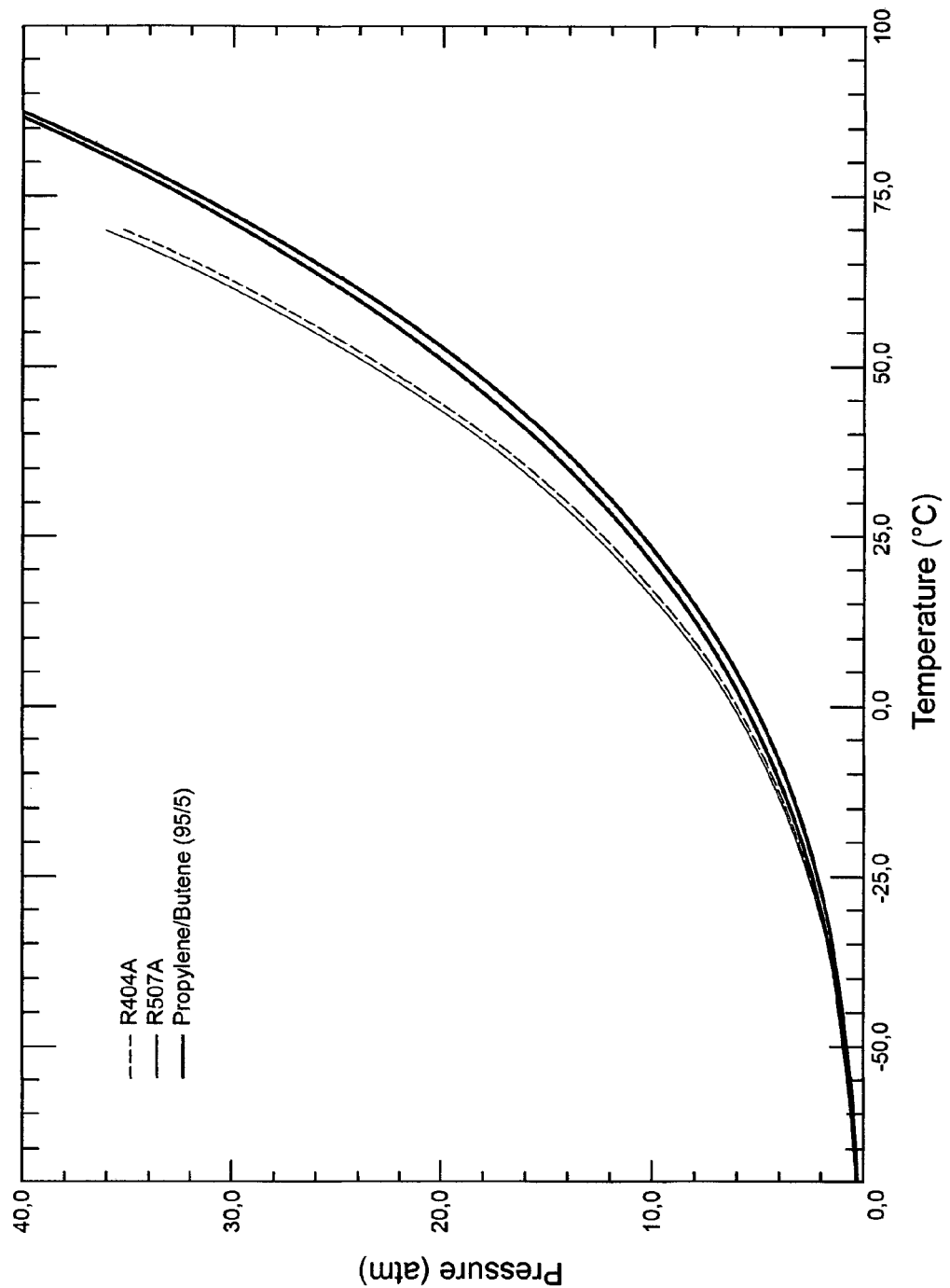
FIGS. 1 to 6 are diagrams illustrating examples of pressure and temperature curves for gas mixtures, according to various embodiments of this disclosure.

The present invention relates to gaseous mixtures that are useful as replacement or alternative refrigerants for the mixtures R404A, R507A and R407C.

R404A, R507A and R407C are mixtures of hydrofluorocarbons which are used as a replacement refrigerant gas for chlorofluorocarbons or hydrochlorofluorocarbons, which have a considerable ozone depletion potential (ODP hereinbelow) and which are regulated by the Montreal protocol.

In particular, R404A is a ternary mixture containing 44% pentafluoroethane (R125), 52% 1,1,1-trifluoroethane (R143a) and 4% 1,1,1,2-tetrafluoroethane (R134a), the characteristics of which are not very different from those of an azeotropic mixture, with a temperature glide of less than 1° C.

However, it is a mixture which has a high global warming potential (GWP hereinbelow), due mainly to the presence of R143a and R125, and, following the Kyoto protocol, the European regulation has limited and will gradually limit its availability and use in air-conditioning or refrigeration plants.

R507A is a binary mixture containing 50% 1,1,1-trifluoroethane (R143a) and 50% pentafluoroethane (R125); it is a mixture with azeotropic characteristics over a relatively broad range, but which in turn has a rather high GWP value, equal to 3300.

R407C is a ternary mixture containing 52% 1,1,1,2-tetrafluoroethane (R134a), 25% pentafluoroethane (R125) and 23% difluoromethane (R32). This mixture is considered a favorite candidate for replacing R22 in the short term, since it has good correspondence with the properties of the latter refrigerant, despite the fact that its GWP value is, however, high and equal to about 1600.

Another general drawback relating to the mixtures mentioned above is their relatively high cost.

US 2009/261 289 describes binary mixtures of propene/propane including a 90%/10% by weight composition of propene/propane; the properties of these mixtures are compared with R407C.

The main aim of the present invention is to provide refrigerant gas mixtures that may be used as replacements and alternatives to R404A, R507 and R407C, and/or other replacement or alternative refrigerants for R404A, R507 and R407C containing HFC (hydrofluorocarbons), HFO (hydrofluoro olefins) and HFE (hydrofluoro ethers), which have a lower production cost and an improved environmental impact, particularly in terms of the GWP, and which are therefore capable of satisfying the environmental norms, even in the long term.

The aim of the invention is to provide gas mixtures, which are also suitable as replacement or alternative mixtures for R22, in a broad field of air-conditioning and refrigeration applications.

In view of these aims, one subject of the invention is the use of a gaseous mixture selected from the group consisting of:

propylene in a concentration from 90% to 99% by weight and a gas selected from the group consisting of butene, ethylene and ethane and mixtures thereof in a concentration from 1% to 10% by weight, as a replacement or alternative refrigerant gas for R404A, R507A and/or R407C, in air-conditioning or refrigeration plants.

In the present description, the term "butene" should be understood as including 1-butene, cis or trans 2-butene and isobutene.

The mixtures according to the invention find use both in new production plants and as retrofitting in existing plants, requiring only the replacement of certain components which are the flammable mixtures according to the invention.

In particular, the mixtures according to the invention find application in air-conditioning systems of motor vehicles, refrigerated cabinets for supermarkets, cold stores, domestic refrigerators, centrifugal chillers, domestic, commercial and industrial air-conditioning plants, domestic, commercial and industrial chillers, air-conditioning or refrigeration plants in the process industry, refrigerated transport, chilled water dispensers, commercial ice machines, and domestic, commercial and industrial dehumidifiers.

Air-conditioning or refrigeration plants which use the mixtures according to the invention as refrigerant also fall within the scope of the invention.

Another subject of the invention is mixtures consisting of:
propylene in a concentration from 90% to 99% by weight and butene in a concentration from 10% to 1% by weight, or
propylene in a concentration from 92% to 99% by weight and ethylene in a concentration from 8% to 1% by weight [RM1].

Within the scope of the restricted concentration range of the constituent gases of the mixtures, preferred mixtures are those selected from the group consisting of:

92-97%, preferably 93-97% by weight and particularly 95% by weight of propylene and 3-8%, preferably 3-7% by weight and particularly 5% by weight of a gas selected from the group consisting of butylene, ethylene and ethane, and mixtures thereof.

The table which follows illustrates a number of salient characteristics relating to the thermodynamic properties of the mixtures according to the invention within the concentration ranges mentioned above, together with the salient environmental impact characteristics thereof, such as the ODP and the GWP, compared with the corresponding properties of R404A, R507A and R407C.

TABLE 1

|  | Boiling point ° C. | GLIDE ° C. | ODP | GWP |
|---|---|---|---|---|
| Propylene/Butene | −46.1 ÷ −47.5 | 6.3-0.8 | 0 | 1.8-1.84 |
| Propylene/Ethylene | −70.3 ÷ −50.7 | 20-2.8 | 0 | 2.0-1.8 |
| Propylene/Ethane | −60.7 ÷ −49.3 | 10.3-1.4 | 0 | 2.2-1.8 |
| R404A | −46.2 | 0.73 | 0 | 3800 |

TABLE 1-continued

|  | Boiling point °C. | GLIDE °C. | ODP | GWP |
|---|---|---|---|---|
| R507A | −46.7 | 0 | 0 | 3300 |
| R407C | −45.0 | 6.4 | 0 | 1600 |

As is seen from the table given above, the mixtures according to the invention have, in virtually all cases, low glide values (difference between the boiling point and the dew point at a pressure of 1 atmosphere).

When compared with the hydrofluorocarbons mixtures, the GWPs are drastically reduced to values which generally do not exceed 2.2. In general, all the mixtures, particularly those consisting exclusively of hydrocarbons, have optimum affinity with mineral oil lubricant.

Figure 2:
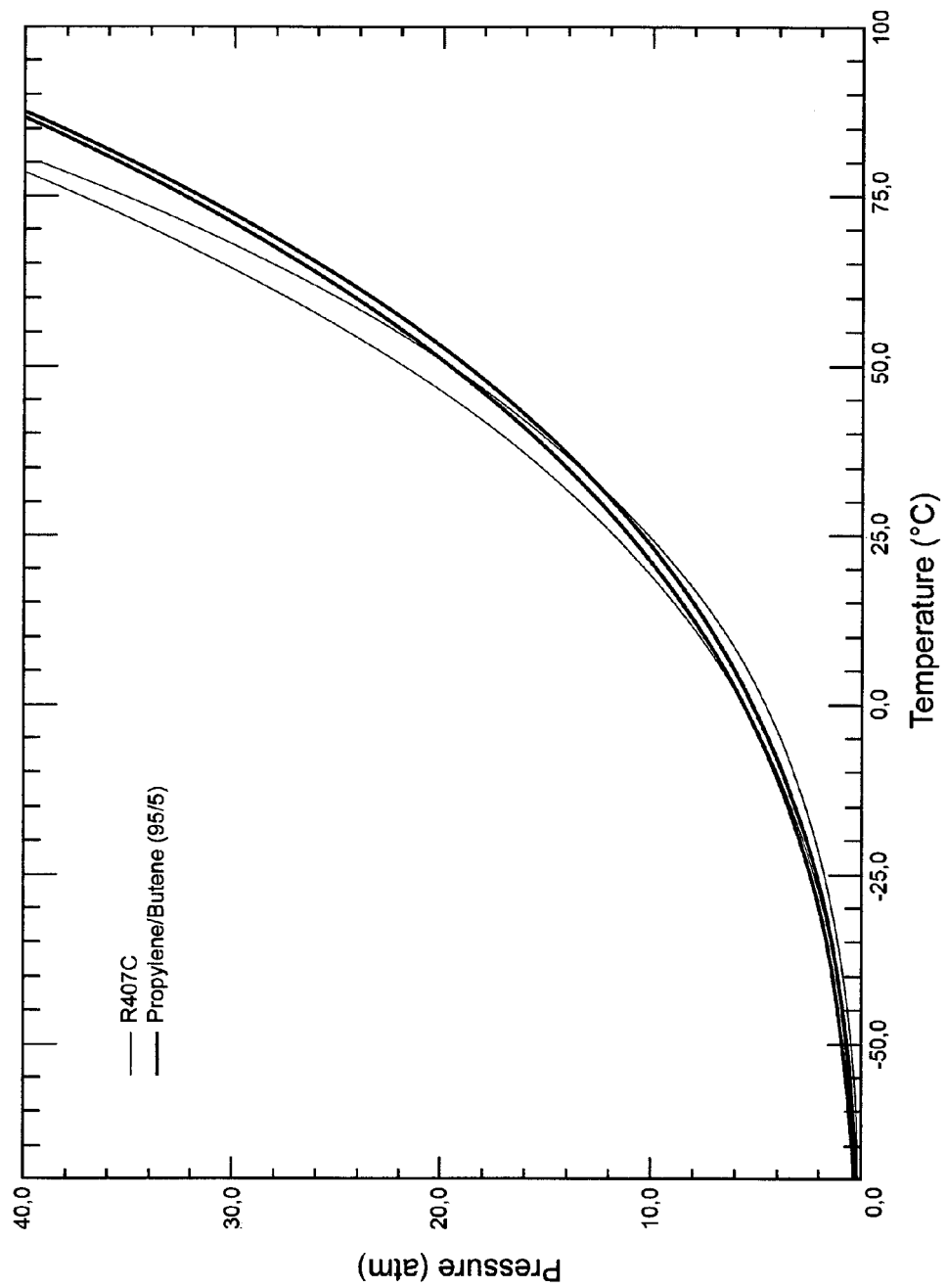
Figure 3:
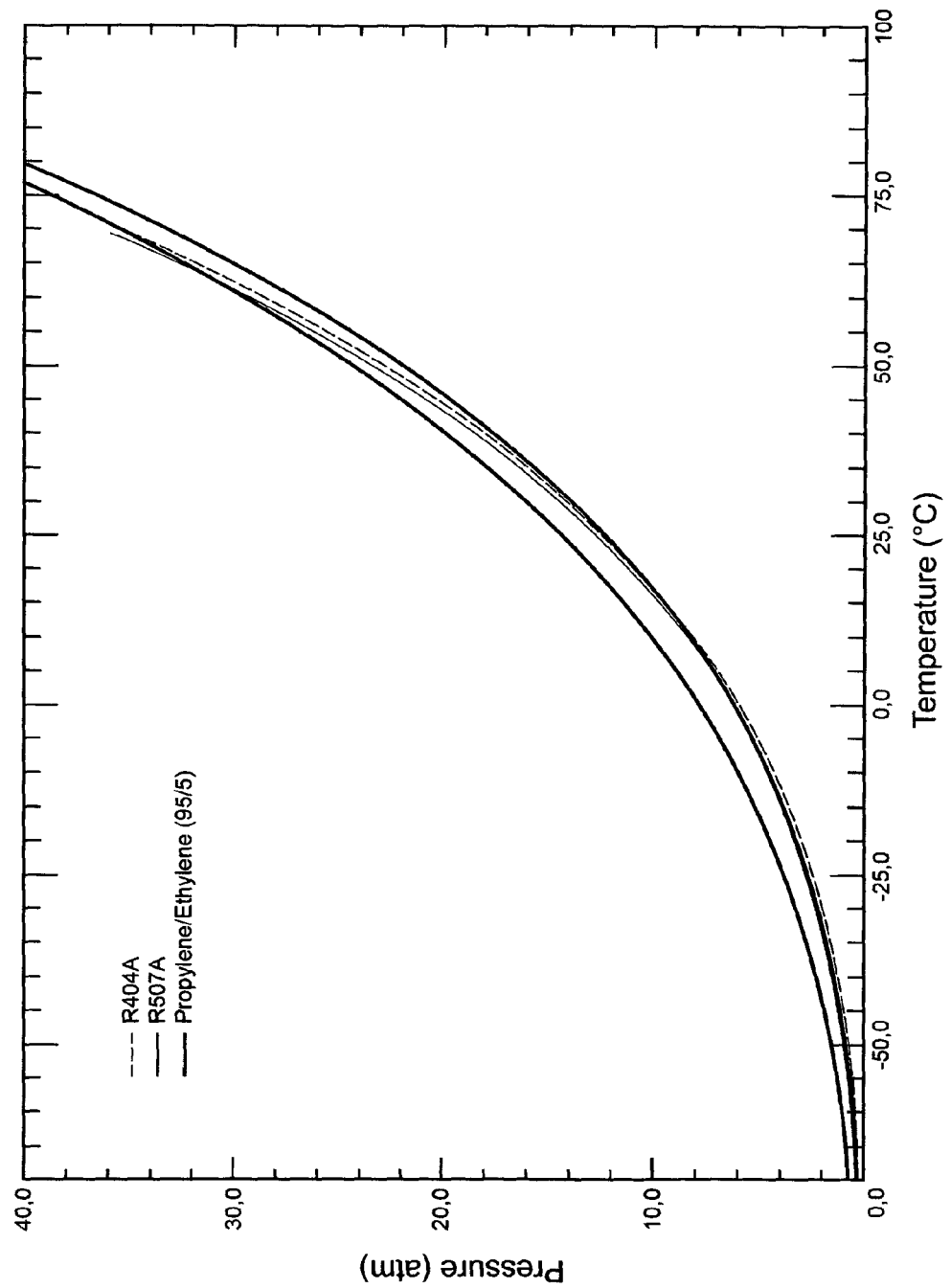
Figure 4:
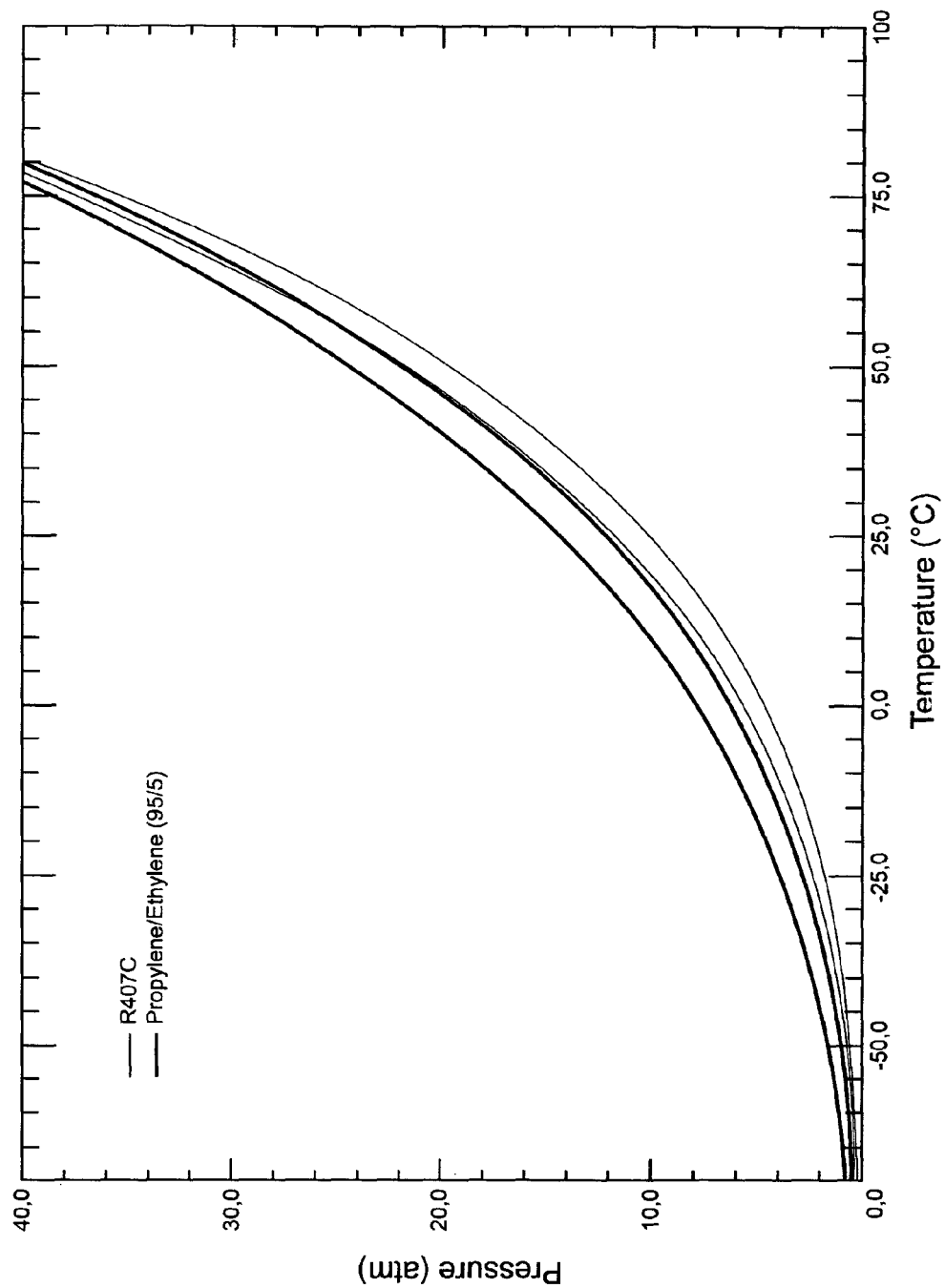
Figure 5:
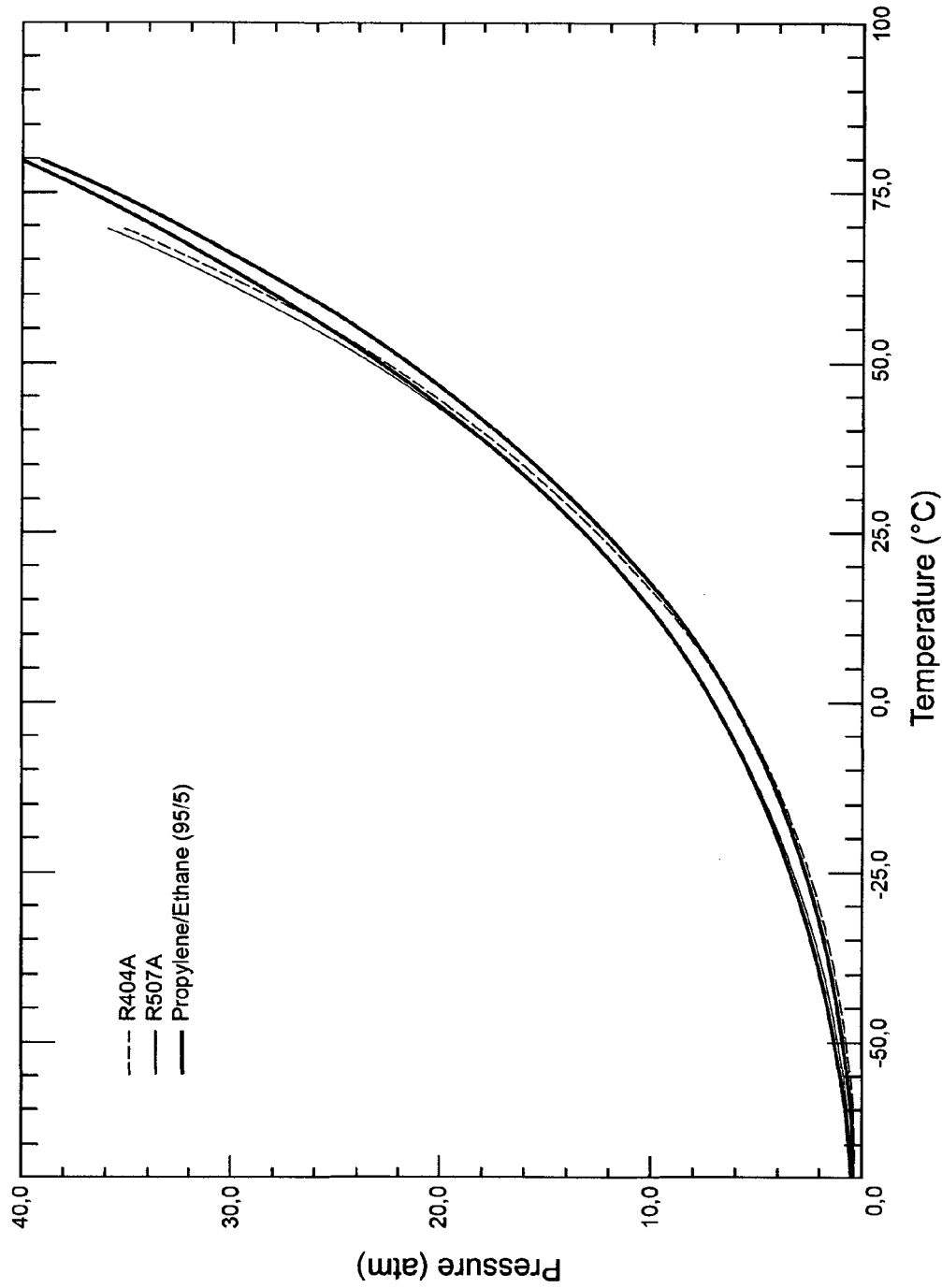
Figure 6:
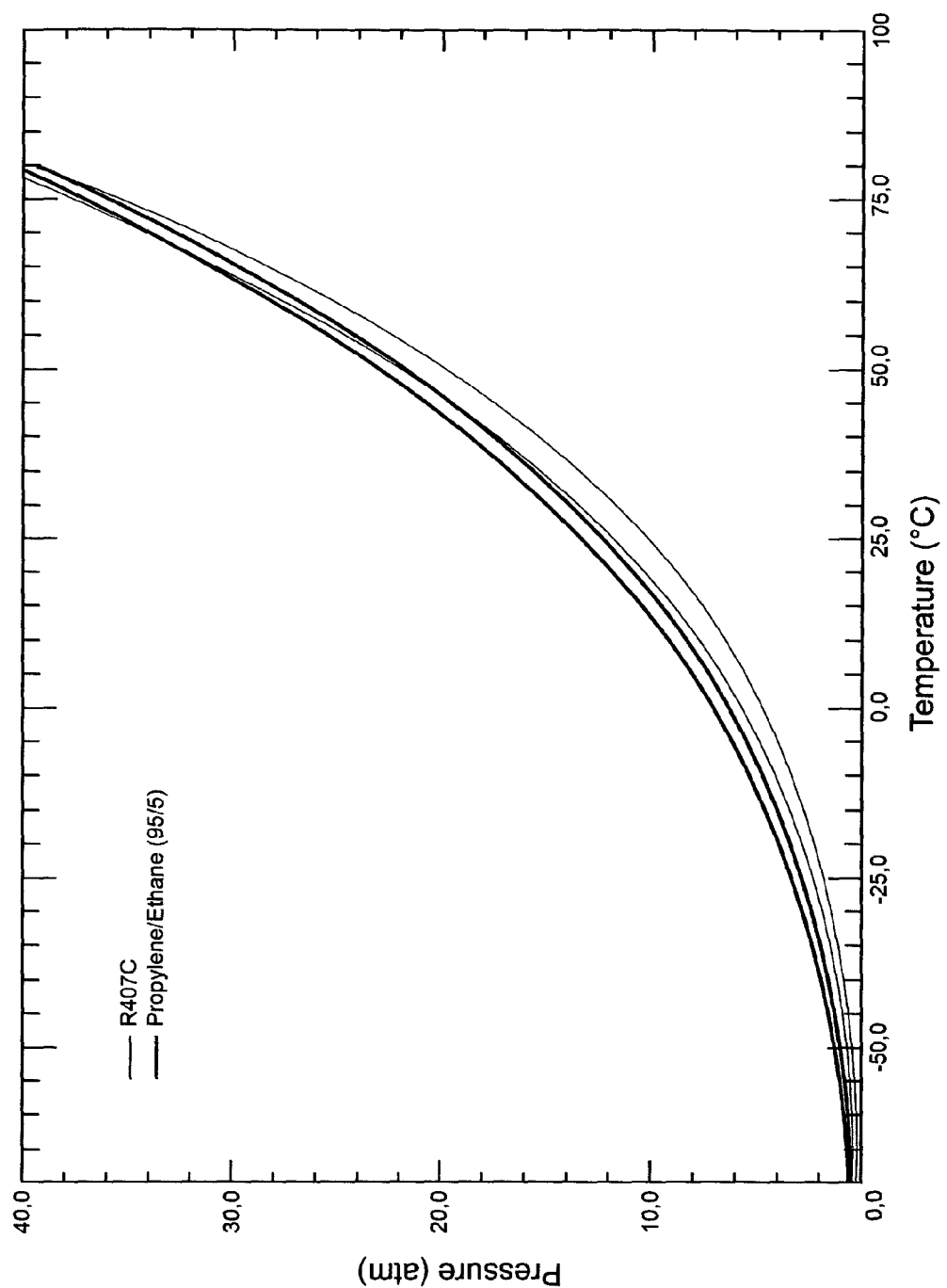

In the attached drawings:

FIGS. 1 to 6 are diagrams illustrating the pressure and temperature curves for the preferred mixtures according to the invention compared with the corresponding curves relating to R404A, R507A and R407C; the relative numerical values are given in Tables 5 to 7.

Example 1

A comparative table between R404A and the replacements that are the subject of the present invention is presented hereinbelow.

TABLE 2

| % | Refrigerant | COPh | COPc |
|---|---|---|---|
| commercial | R404A | 3.000 | 2.029 |
| 95/5 | Propylene/Butene | 3.019 | 2.048 |
| 95/5 | Propylene/Ethylene | 2.967 | 1.996 |
| 95/5 | Propylene/Ethane | 3.131 | 2.160 |

The table describes the coefficients of performance (COP) for mixtures suggested in the present patent, compared with R404A.

The coefficients of performance in heating (COPh) and in cooling (COPc) are indicated in the table.

The values were calculated for an industrial refrigeration plant with a thermal capacity of 61 kW in cooling, undercooling by 5° C. The excess heat was considered as additional heat to the condenser.

The indicated values are the fruit of a mathematical simulation based on thermodynamic data known from the literature, exploiting internationally recognized programs.

It may be observed that, in virtually all cases, the COP of the proposed mixtures is entirely in line with and occasionally superior to that of R404A.

Example 2

A comparative table between R507A and the replacements that are the subject of the present invention is presented hereinbelow.

TABLE 3

| % | Refrigerant | COPh | COPc |
|---|---|---|---|
| commercial | R507A | 3.923 | 3.007 |
| 95/5 | Propylene/Butene | 3.936 | 3.020 |
| 95/5 | Propylene/Ethylene | 3.657 | 2.742 |
| 95/5 | Propylene/Ethane | 3.882 | 2.966 |

The table describes the coefficients of performance (COP) for mixtures suggested in the present patent, compared with R507A.

The coefficients of performance in heating (COPh) and in cooling (COPc) are indicated in the table.

The values were calculated for an industrial refrigeration plant with a thermal capacity of 45.5 kW in cooling, undercooling by 5° C. The excess heat was considered as additional heat to the condenser.

The indicated values are the fruit of a mathematical simulation based on thermodynamic data known from the literature, exploiting internationally recognized programs.

It may be observed that, in many of the illustrated cases, the COP of the proposed mixtures is entirely in line with that of R507A.

Example 3

A comparative table between R407C and the replacements that are the subject of the present invention is presented hereinbelow.

TABLE 4

| % | Refrigerant | COPh | COPc |
|---|---|---|---|
| commercial | R407C | 4.871 | 3.945 |
| 95/5 | Propylene/Butene | 4.970 | 4.043 |
| 95/5 | Propylene/Ethylene | 4.731 | 3.806 |
| 95/5 | Propylene/Ethane | 4.899 | 3.973 |

The table describes the coefficients of performance (COP) for mixtures suggested in the present patent, compared with R407C.

The coefficients of performance in heating (COPh) and in cooling (COPc) are indicated in the table.

The values were calculated for a commercial air-conditioning plant with a thermal capacity of 22 kW in cooling, undercooling by 5° C. The excess heat was considered as additional heat to the condenser.

The indicated values are the fruit of a mathematical simulation based on thermodynamic data known from the literature, exploiting internationally recognized programs.

It may be observed that, in virtually all cases, the COP of the proposed mixtures is entirely in line with and occasionally superior to that of R407C.

TABLE 5

Propylene/Butene (95/5): P/T Table

| T ° C. | $P^L$ R404A atm | $P^V$ R404A atm | $P^L$ R407C atm | $P^V$ R407C atm | $P^L$ R507A atm | $P^V$ R507A atm | $P^L$ mix atm | $P^V$ mix atm |
|---|---|---|---|---|---|---|---|---|
| −70 | 0.27 | 0.26 | 0.23 | 0.14 | 0.28 | 0.28 | 0.31 | 0.24 |
| −65 | 0.37 | 0.35 | 0.32 | 0.20 | 0.38 | 0.38 | 0.41 | 0.33 |
| −60 | 0.49 | 0.47 | 0.42 | 0.27 | 0.50 | 0.50 | 0.53 | 0.43 |
| −55 | 0.64 | 0.62 | 0.56 | 0.37 | 0.66 | 0.66 | 0.68 | 0.57 |
| −50 | 0.83 | 0.80 | 0.73 | 0.50 | 0.85 | 0.85 | 0.87 | 0.73 |
| −45 | 1.06 | 1.02 | 0.94 | 0.65 | 1.09 | 1.09 | 1.09 | 0.93 |
| −40 | 1.34 | 1.29 | 1.19 | 0.85 | 1.37 | 1.37 | 1.35 | 1.17 |
| −35 | 1.66 | 1.61 | 1.49 | 1.08 | 1.70 | 1.70 | 1.66 | 1.45 |
| −30 | 2.05 | 2.00 | 1.85 | 1.37 | 2.10 | 2.10 | 2.02 | 1.78 |
| −25 | 2.50 | 2.44 | 2.27 | 1.71 | 2.57 | 2.56 | 2.44 | 2.17 |
| −20 | 3.03 | 2.96 | 2.76 | 2.12 | 3.10 | 3.10 | 2.92 | 2.62 |
| −15 | 3.64 | 3.56 | 3.34 | 2.60 | 3.73 | 3.72 | 3.47 | 3.13 |
| −10 | 4.33 | 4.25 | 3.99 | 3.16 | 4.44 | 4.43 | 4.09 | 3.72 |
| −5 | 5.13 | 5.04 | 4.75 | 3.80 | 5.25 | 5.24 | 4.79 | 4.38 |
| 0 | 6.02 | 5.92 | 5.60 | 4.55 | 6.16 | 6.16 | 5.58 | 5.14 |
| 5 | 7.03 | 6.93 | 6.57 | 5.40 | 7.19 | 7.19 | 6.46 | 5.98 |
| 10 | 8.16 | 8.05 | 7.66 | 6.36 | 8.35 | 8.34 | 7.44 | 6.92 |
| 15 | 9.43 | 9.31 | 8.88 | 7.46 | 9.64 | 9.63 | 8.52 | 7.96 |
| 20 | 10.83 | 10.70 | 10.24 | 8.69 | 11.07 | 11.06 | 9.71 | 9.12 |
| 25 | 12.38 | 12.25 | 11.75 | 10.07 | 12.66 | 12.65 | 11.03 | 10.40 |
| 30 | 14.10 | 13.96 | 13.41 | 11.61 | 14.41 | 14.40 | 12.46 | 11.80 |
| 35 | 15.98 | 15.84 | 15.25 | 13.32 | 16.34 | 16.32 | 14.03 | 13.34 |
| 40 | 18.06 | 17.91 | 17.26 | 15.21 | 18.45 | 18.44 | 15.74 | 15.01 |
| 45 | 20.32 | 20.18 | 19.47 | 17.31 | 20.77 | 20.75 | 17.59 | 16.84 |
| 50 | 22.80 | 22.66 | 21.87 | 19.62 | 23.30 | 23.29 | 19.60 | 18.82 |
| 55 | 25.51 | 25.37 | 24.49 | 22.16 | 26.07 | 26.05 | 21.77 | 20.98 |
| 60 | 28.47 | 28.34 | 27.33 | 24.96 | 29.10 | 29.08 | 24.12 | 23.31 |
| 65 | 31.71 | 31.59 | 30.41 | 28.03 | 32.42 | 32.40 | 26.64 | 25.83 |
| 70 | 35.26 | 35.17 | 33.74 | 31.41 | 36.08 | 36.08 | 29.35 | 28.55 |
| 75 | | | 37.34 | 35.14 | | | 32.27 | 31.48 |
| 80 | | | 41.19 | 39.29 | | | 35.40 | 34.66 |
| 85 | | | | | | | 38.76 | 38.09 |
| 90 | | | | | | | 42.37 | 41.84 |

TABLE 6

Propylene/Ethylene (95/5): P/T Table

| T ° C. | $P^L$ R404A atm | $P^V$ R404A atm | $P^L$ R407C atm | $P^V$ R407C atm | $P^L$ R507A atm | $P^V$ R507A atm | $P^L$ mix atm | $P^V$ mix atm |
|---|---|---|---|---|---|---|---|---|
| −70 | 0.27 | 0.26 | 0.23 | 0.14 | 0.28 | 0.28 | 0.67 | 0.34 |
| −65 | 0.37 | 0.35 | 0.32 | 0.20 | 0.38 | 0.38 | 0.84 | 0.45 |
| −60 | 0.49 | 0.47 | 0.42 | 0.27 | 0.50 | 0.50 | 1.04 | 0.59 |
| −55 | 0.64 | 0.62 | 0.56 | 0.37 | 0.66 | 0.66 | 1.28 | 0.76 |
| −50 | 0.83 | 0.80 | 0.73 | 0.50 | 0.85 | 0.85 | 1.57 | 0.96 |
| −45 | 1.06 | 1.02 | 0.94 | 0.65 | 1.09 | 1.09 | 1.89 | 1.21 |
| −40 | 1.34 | 1.29 | 1.19 | 0.85 | 1.37 | 1.37 | 2.27 | 1.50 |
| −35 | 1.66 | 1.61 | 1.49 | 1.08 | 1.70 | 1.70 | 2.71 | 1.84 |
| −30 | 2.05 | 2.00 | 1.85 | 1.37 | 2.10 | 2.10 | 3.21 | 2.24 |
| −25 | 2.50 | 2.44 | 2.27 | 1.71 | 2.57 | 2.56 | 3.77 | 2.70 |
| −20 | 3.03 | 2.96 | 2.76 | 2.12 | 3.10 | 3.10 | 4.41 | 3.24 |
| −15 | 3.64 | 3.56 | 3.34 | 2.60 | 3.73 | 3.72 | 5.12 | 3.84 |
| −10 | 4.33 | 4.25 | 3.99 | 3.16 | 4.44 | 4.43 | 5.92 | 4.53 |
| −5 | 5.13 | 5.04 | 4.75 | 3.80 | 5.25 | 5.24 | 6.81 | 5.31 |
| 0 | 6.02 | 5.92 | 5.60 | 4.55 | 6.16 | 6.16 | 7.80 | 6.19 |
| 5 | 7.03 | 6.93 | 6.57 | 5.40 | 7.19 | 7.19 | 8.88 | 7.16 |
| 10 | 8.16 | 8.05 | 7.66 | 6.36 | 8.35 | 8.34 | 10.08 | 8.25 |
| 15 | 9.43 | 9.31 | 8.88 | 7.46 | 9.64 | 9.63 | 11.39 | 9.45 |
| 20 | 10.83 | 10.70 | 10.24 | 8.69 | 11.07 | 11.06 | 12.82 | 10.78 |
| 25 | 12.38 | 12.25 | 11.75 | 10.07 | 12.66 | 12.65 | 14.38 | 12.24 |
| 30 | 14.10 | 13.96 | 13.41 | 11.61 | 14.41 | 14.40 | 16.07 | 13.85 |
| 35 | 15.98 | 15.84 | 15.25 | 13.32 | 16.34 | 16.32 | 17.90 | 15.60 |
| 40 | 18.06 | 17.91 | 17.26 | 15.21 | 18.45 | 18.44 | 19.89 | 17.51 |
| 45 | 20.32 | 20.18 | 19.47 | 17.31 | 20.77 | 20.75 | 22.02 | 19.59 |
| 50 | 22.80 | 22.66 | 21.87 | 19.62 | 23.30 | 23.29 | 24.32 | 21.85 |
| 55 | 25.51 | 25.37 | 24.49 | 22.16 | 26.07 | 26.05 | 26.80 | 24.30 |
| 60 | 28.47 | 28.34 | 27.33 | 24.96 | 29.10 | 29.08 | 29.44 | 26.96 |
| 65 | 31.71 | 31.59 | 30.41 | 28.03 | 32.42 | 32.40 | 32.28 | 29.84 |
| 70 | 35.26 | 35.17 | 33.74 | 31.41 | 36.08 | 36.08 | 35.31 | 32.96 |

TABLE 6-continued

Propylene/Ethylene (95/5): P/T Table

| T ° C. | $P^L$ R404A atm | $P^V$ R404A atm | $P^L$ R407C atm | $P^V$ R407C atm | $P^L$ R507A atm | $P^V$ R507A atm | $P^L$ mix atm | $P^V$ mix atm |
|---|---|---|---|---|---|---|---|---|
| 75 | | | 37.34 | 35.14 | | | 38.54 | 36.34 |
| 80 | | | 41.19 | 39.29 | | | 41.97 | 40.04 |

TABLE 7

Propylene/Ethane (95/5): P/T Table

| T ° C. | $P^L$ R404A atm | $P^V$ R404A atm | $P^L$ R407C atm | $P^V$ R407C atm | $P^L$ R507A atm | $P^V$ R507A atm | $P^L$ mix atm | $P^V$ mix atm |
|---|---|---|---|---|---|---|---|---|
| −70 | 0.27 | 0.26 | 0.23 | 0.14 | 0.28 | 0.28 | 0.49 | 0.34 |
| −65 | 0.37 | 0.35 | 0.32 | 0.20 | 0.38 | 0.38 | 0.63 | 0.45 |
| −60 | 0.49 | 0.47 | 0.42 | 0.27 | 0.50 | 0.50 | 0.80 | 0.58 |
| −55 | 0.64 | 0.62 | 0.56 | 0.37 | 0.66 | 0.66 | 1.00 | 0.75 |
| −50 | 0.83 | 0.80 | 0.73 | 0.50 | 0.85 | 0.85 | 1.25 | 0.95 |
| −45 | 1.06 | 1.02 | 0.94 | 0.65 | 1.09 | 1.09 | 1.53 | 1.20 |
| −40 | 1.34 | 1.29 | 1.19 | 0.85 | 1.37 | 1.37 | 1.87 | 1.48 |
| −35 | 1.66 | 1.61 | 1.49 | 1.08 | 1.70 | 1.70 | 2.25 | 1.82 |
| −30 | 2.05 | 2.00 | 1.85 | 1.37 | 2.10 | 2.10 | 2.70 | 2.22 |
| −25 | 2.50 | 2.44 | 2.27 | 1.71 | 2.57 | 2.56 | 3.21 | 2.68 |
| −20 | 3.03 | 2.96 | 2.76 | 2.12 | 3.10 | 3.10 | 3.80 | 3.20 |
| −15 | 3.64 | 3.56 | 3.34 | 2.60 | 3.73 | 3.72 | 4.45 | 3.80 |
| −10 | 4.33 | 4.25 | 3.99 | 3.16 | 4.44 | 4.43 | 5.19 | 4.48 |
| −5 | 5.13 | 5.04 | 4.75 | 3.80 | 5.25 | 5.24 | 6.02 | 5.25 |
| 0 | 6.02 | 5.92 | 5.60 | 4.55 | 6.16 | 6.16 | 6.95 | 6.12 |
| 5 | 7.03 | 6.93 | 6.57 | 5.40 | 7.19 | 7.19 | 7.97 | 7.08 |
| 10 | 8.16 | 8.05 | 7.66 | 6.36 | 8.35 | 8.34 | 9.11 | 8.15 |
| 15 | 9.43 | 9.31 | 8.88 | 7.46 | 9.64 | 9.63 | 10.35 | 9.34 |
| 20 | 10.83 | 10.70 | 10.24 | 8.69 | 11.07 | 11.06 | 11.72 | 10.65 |
| 25 | 12.38 | 12.25 | 11.75 | 10.07 | 12.66 | 12.65 | 13.22 | 12.09 |
| 30 | 14.10 | 13.96 | 13.41 | 11.61 | 14.41 | 14.40 | 14.85 | 13.66 |
| 35 | 15.98 | 15.84 | 15.25 | 13.32 | 16.34 | 16.32 | 16.62 | 15.39 |
| 40 | 18.06 | 17.91 | 17.26 | 15.21 | 18.45 | 18.44 | 18.54 | 17.26 |
| 45 | 20.32 | 20.18 | 19.47 | 17.31 | 20.77 | 20.75 | 20.62 | 19.31 |
| 50 | 22.80 | 22.66 | 21.87 | 19.62 | 23.30 | 23.29 | 22.86 | 21.52 |
| 55 | 25.51 | 25.37 | 24.49 | 22.16 | 26.07 | 26.05 | 25.28 | 23.93 |
| 60 | 28.47 | 28.34 | 27.33 | 24.96 | 29.10 | 29.08 | 27.89 | 26.53 |
| 65 | 31.71 | 31.59 | 30.41 | 28.03 | 32.42 | 32.40 | 30.68 | 29.34 |
| 70 | 35.26 | 35.17 | 33.74 | 31.41 | 36.08 | 36.08 | 33.68 | 32.38 |
| 75 | | | 37.34 | 35.14 | | | 36.89 | 35.67 |
| 80 | | | 41.19 | 39.29 | | | 40.32 | 39.24 |

The invention claimed is:

1. A method of refrigerating or air conditioning in an air conditioning or refrigeration plant, with the use of a refrigerant gaseous mixture, the method comprising:

providing a gaseous mixture consisting of propylene in a concentration from 90% to 99% by weight and a gas selected from the group consisting of butene, ethylene, ethane, and mixtures thereof in a concentration from 1% to 10% by weight; and using said gaseous mixture as a replacement or alternative refrigerant gas for R404A, R507A or R407C in said air conditioning or refrigeration plant.

2. The method according to claim 1, wherein said gaseous mixture consists of 93-97% by weight of propylene and 7% to 3% by weight of a gas selected from the group consisting of butene, ethylene, ethane and mixtures thereof.

3. The method according to claim 1, wherein the gaseous mixture consists of 95% by weight of propylene and 5% by weight of butene.

4. The method according to claim 1, wherein the gaseous mixture consists of 95% by weight of propylene and 5% by weight of ethylene.

5. The method according to claim 1, wherein the gaseous mixture consists of 95% by weight of propylene and 5% by weight of ethane.

6. The method according to claim 1, wherein said air conditioning or refrigeration plant is selected from the group consisting of motor vehicles, refrigerated cabinets for supermarkets, cold stores, domestic refrigerators, centrifugal chillers, domestic, commercial and industrial air-conditioning plants, domestic, commercial and industrial chillers, air-conditioning or refrigeration plants in the process industry, refrigerated transport, chilled water dispensers, commercial ice machines, and domestic, commercial and industrial dehumidifiers.

7. A method according to claim 1, wherein said air conditioning or refrigeration plant is designed for use with a refrigerant selected from the group consisting of R404A, R507A, or R407C.

* * * * *